United States Patent [19]
Trom et al.

[11] Patent Number: 5,898,429
[45] Date of Patent: Apr. 27, 1999

[54] SYSTEM AND METHOD FOR LABELING ELEMENTS IN ANIMATED MOVIES USING MATTE DATA

[75] Inventors: Jeffrey D Trom; Eric J. Roccasecca, both of Ames, Iowa

[73] Assignee: Engineering Animation Inc., Ames, Iowa

[21] Appl. No.: 08/633,964

[22] Filed: Apr. 19, 1996

[51] Int. Cl.$^6$ .................................................. G06F 15/00
[52] U.S. Cl. ............................................ 345/302; 707/501
[58] Field of Search .................................. 345/473, 302; 395/773, 762, 173; 707/501

[56] References Cited

U.S. PATENT DOCUMENTS

| | | | |
|---|---|---|---|
| 4,899,292 | 2/1990 | Montagna et al. | 364/762 |
| 5,142,662 | 8/1992 | Gump et al. | 395/762 |
| 5,539,871 | 7/1996 | Gibson | 395/762 |
| 5,550,965 | 8/1996 | Gabbe et al. | 395/773 |
| 5,559,949 | 9/1996 | Reimer et al. | 395/327 |
| 5,590,262 | 12/1996 | Isadore-Barreca | 395/806 |
| 5,596,705 | 1/1997 | Reimer et al. | 395/326 |
| 5,600,775 | 2/1997 | King et al. | 395/806 |
| 5,654,748 | 8/1997 | Matthews, III | 348/13 |
| 5,666,542 | 9/1997 | Katai et al. | 395/762 |

OTHER PUBLICATIONS

Woolsey, "Multimedia Scouting," IEEE Computer Graphics & Applications, vol. 11, No. 4, Jul. 1991, pp. 26–38.

"Multimedia Hypervideo Links For Full Motion Video," IBM Tech. Disc. Bulletin, v.37, N.4A, pp. 95–96, Apr. 1994.

"Interactive Movie Takes Top Honors at QuickTime Film Festival," Hyperbole Studios Press Release, Jun. 6, 1992.

"*Inside MacIntosh*", Apple Computer, Inc., Addison-Wesley Publishing Company, Chapter 2: Movie Toolbox, pp. 2–290 –2–301, (1993).

Primary Examiner—Joseph R. Burwell
Attorney, Agent, or Firm—Schwegman, Lundberg, Woessner & Kluth, P.A.

[57] ABSTRACT

A system and method for labeling animation movies and for displaying such labels is described. The method of labeling includes identifying the individual figures in the animated movie frame and creating a corresponding matte frame which relates the regions of the figures to labels. Such labels can be textual descriptions, Uniform Resource Locators (URLs) or other data. The method of displaying such labels includes accepting a user input during the playing of an animated movie and then displaying the label associated with the figure selected. Multiple labels can be linked to the same figure in a movie, so that different labels are available to meet the needs of a variety of users. For example, the same figure can have different labels which offer descriptions in foreign languages or for different education levels.

7 Claims, 10 Drawing Sheets

SYSTEM AND METHOD FOR LABELING ELEMENTS IN ANIMATED MOVIES USING MATTE DATA

FIELD OF THE INVENTION

The present invention relates to computer systems and in particular to computer-generated animation movies.

SUMMARY OF THE INVENTION

A computer-generated animation movie is a series of individually rendered frames. As with traditional animation, movement through time is simulated by slightly changing the position of the rendered objects in each frame so that when viewed rapidly, the objects appear to move and rotate. These animations are created for a variety of purposes, including entertainment and education. For educational purposes, animations provide a way to present a complicated system to the student, to break the system into its identifiable parts and to show how the parts assemble to form the system. For example, computer generated animations can help students see and learn about the workings of the human body or a car's engine. In the case of the engine, an animation might present the engine in its entirety, then systematically disassemble the engine while explaining the parts involved. This explanation may be provided by an audio track within the animation movie or by text presented to the user as part of the animation. These textual descriptions are troublesome because the animator must anticipate when such information will be helpful to the movie viewer. Since the text must display long enough for the viewer to read it, the text must be included on many sequential frames. Since the text is implemented on the animated frames, there is a tension for the animator between displaying enough text to be helpful and not wasting too much frame space which could be used to show the animated objects. Finally, since the animated movie might be used by several grade-levels of student viewers, the descriptions must be appropriate for all grade-levels or else separate animated movies, each with a different level of textual descriptions, must be produced and marketed.

There is a need in the art to be able to associate textual labels with the objects in the frames of an animated movie. This would make the movie interactive. The viewer could, using an input device such as a mouse, select various objects in the movie and have the movie respond with the appropriate label description for each object. This would solve the problems of anticipating when such textual information would be useful for the viewer and how to provide a large number of descriptions without wasting frame space. There is a need for such labels to be multi-dimensional, so that the movie could be used by different grade-levels of student viewers.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the present invention is defined by the appended claims.

Figure 1:
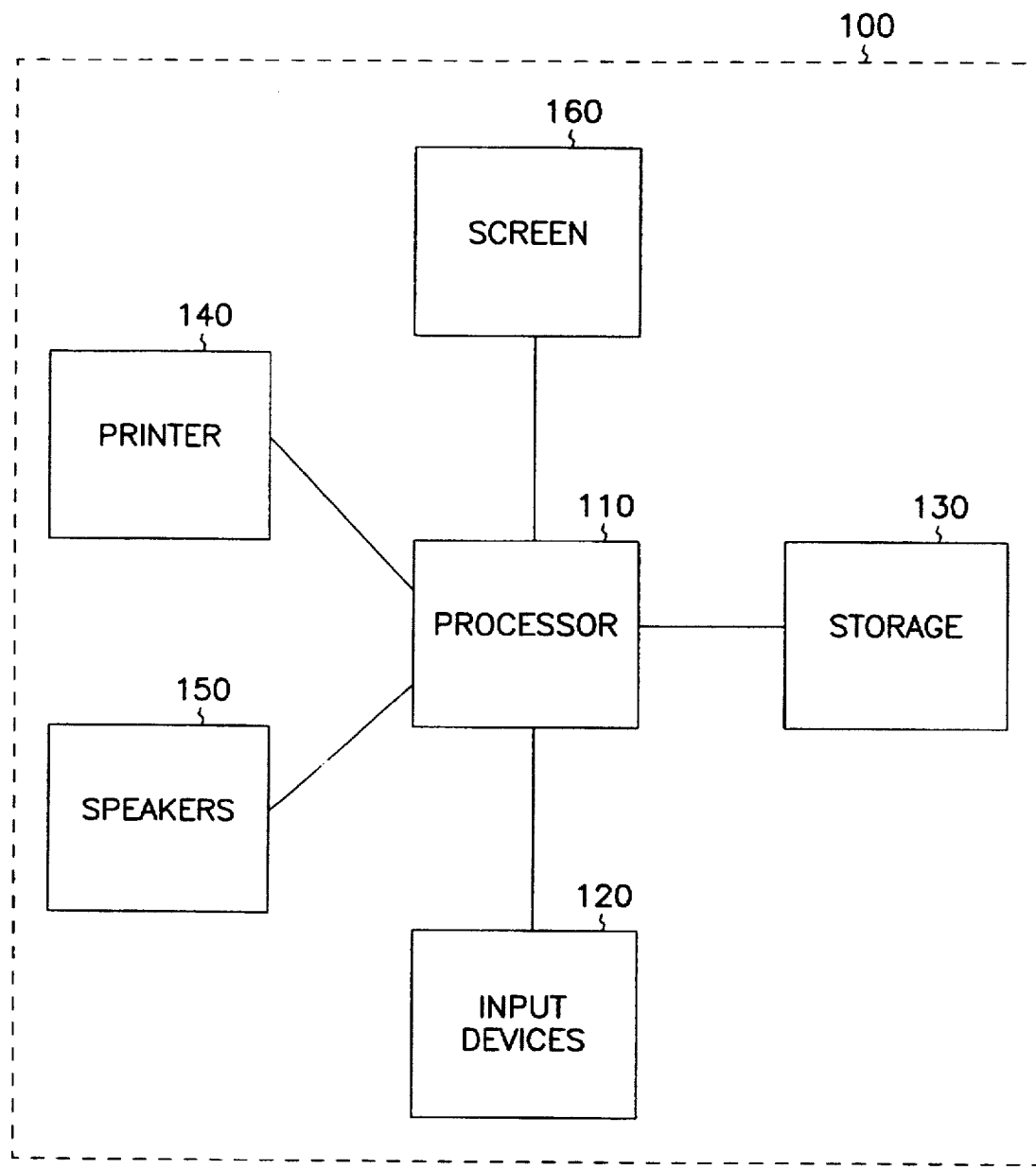
FIG. 1 is a block diagram of a computer system for creating and playing animated movies.

FIG. 1 illustrates a block diagram of a computer system 100 in which the present invention is capable of being run. A computer processor 110 is connected to input devices 120, such as a keyboard and mouse, storage devices 130 including RAM and disks, a printer 140, speakers 150 and a screen 160.

Figure 2:
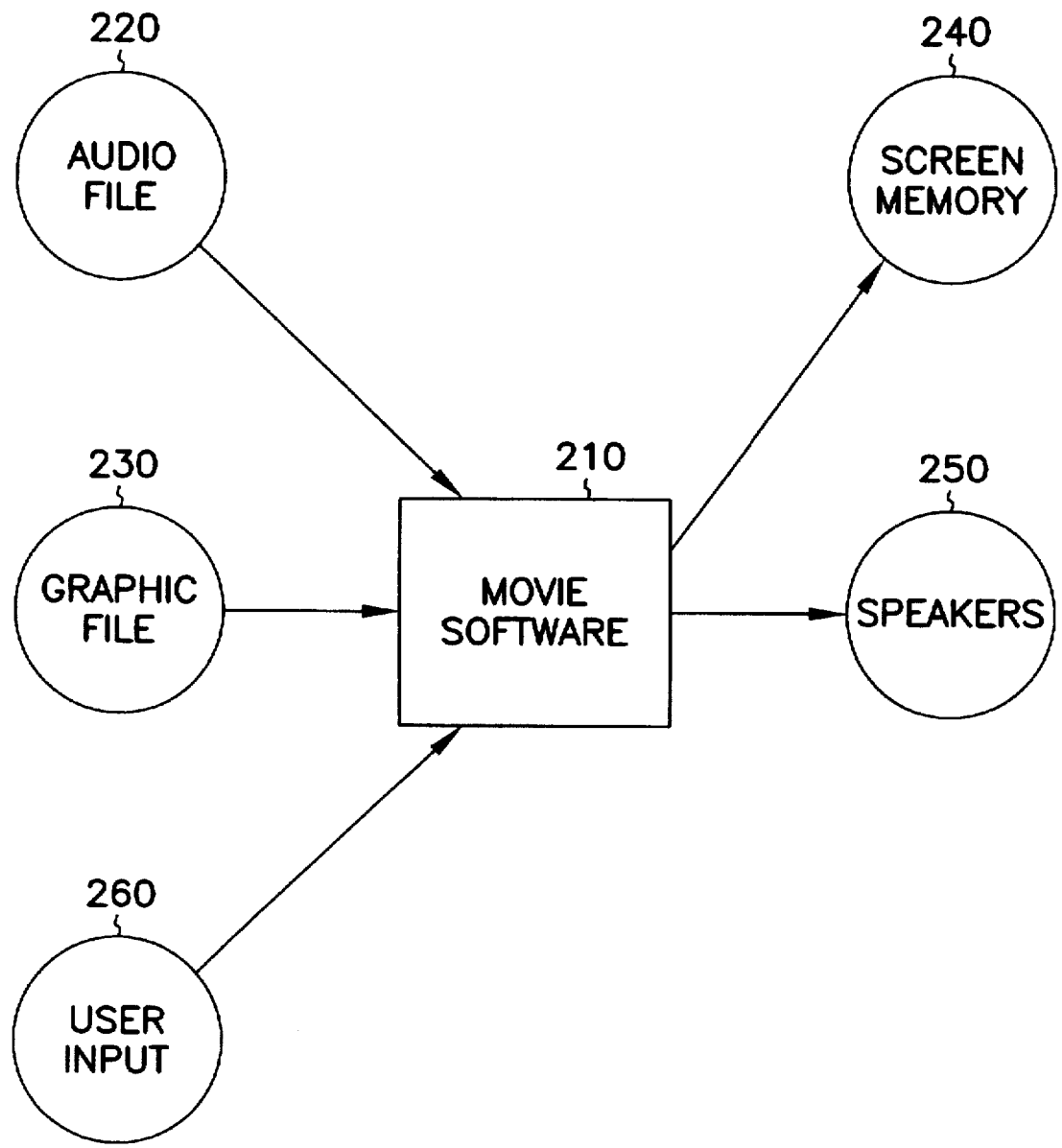
FIG. 2 is a block diagram of movie-generating software acting upon inputs to create an animated movie.

A computer system, represented by FIG. 1, can be capable of playing animated sequences. An example of such a movie system is Apple's QuickTime movie extension. The QuickTime extension stores the synchronized tracks of the movie, including the control data and one or more audio and video tracks. FIG. 2 is a block diagram of the procedure of playing a movie. As with traditional cartoons, computer-generated animated movies are comprised of a series of frames, which are displayed in succession to create the illusion of movement. For each frame of the movie, the QuickTime software 210 acts upon the frame's audio data 220 and graphic data 230 as inputs to load the screen memory locations 240 and to activate the speakers 250 to display and play the stored image and sound. User input 260 can stop the movie or jump it to another frame.

Figure 3:
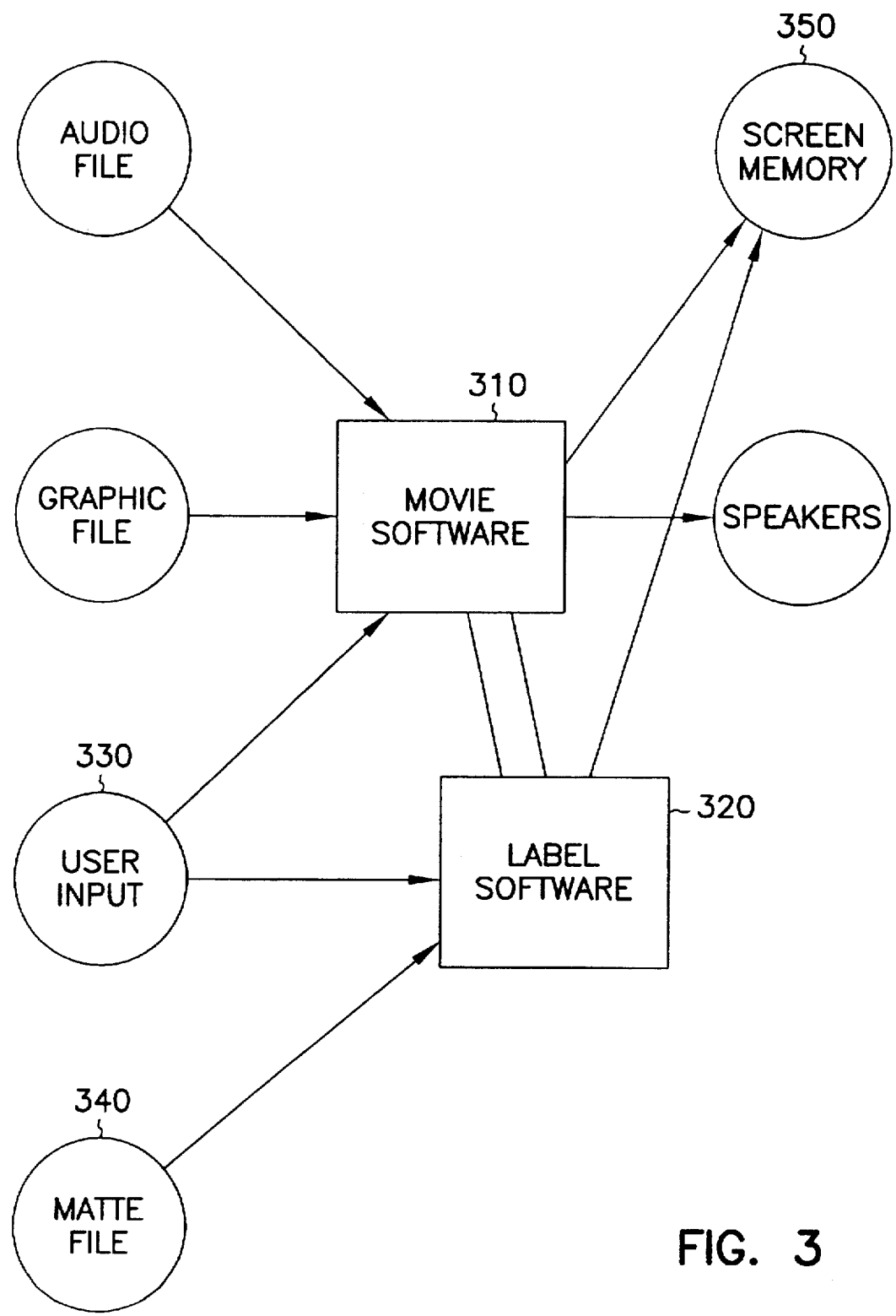
FIG. 3 is the block diagram of FIG. 2 with the present invention added which produces labels for the objects in the animation.

FIG. 3 is a block diagram showing the additional elements to the procedure of playing a movie by one embodiment of the present invention. Along with the QuickTime software 310, the present invention's Label Identifier software 320 waits for user input 330 by a mouse or other pointing device. At that time, a matte file 340 which corresponds to the graphic file is used to determine which label and description should be loaded in the screen memory locations 350 to activate the screen display.

Figure 4:
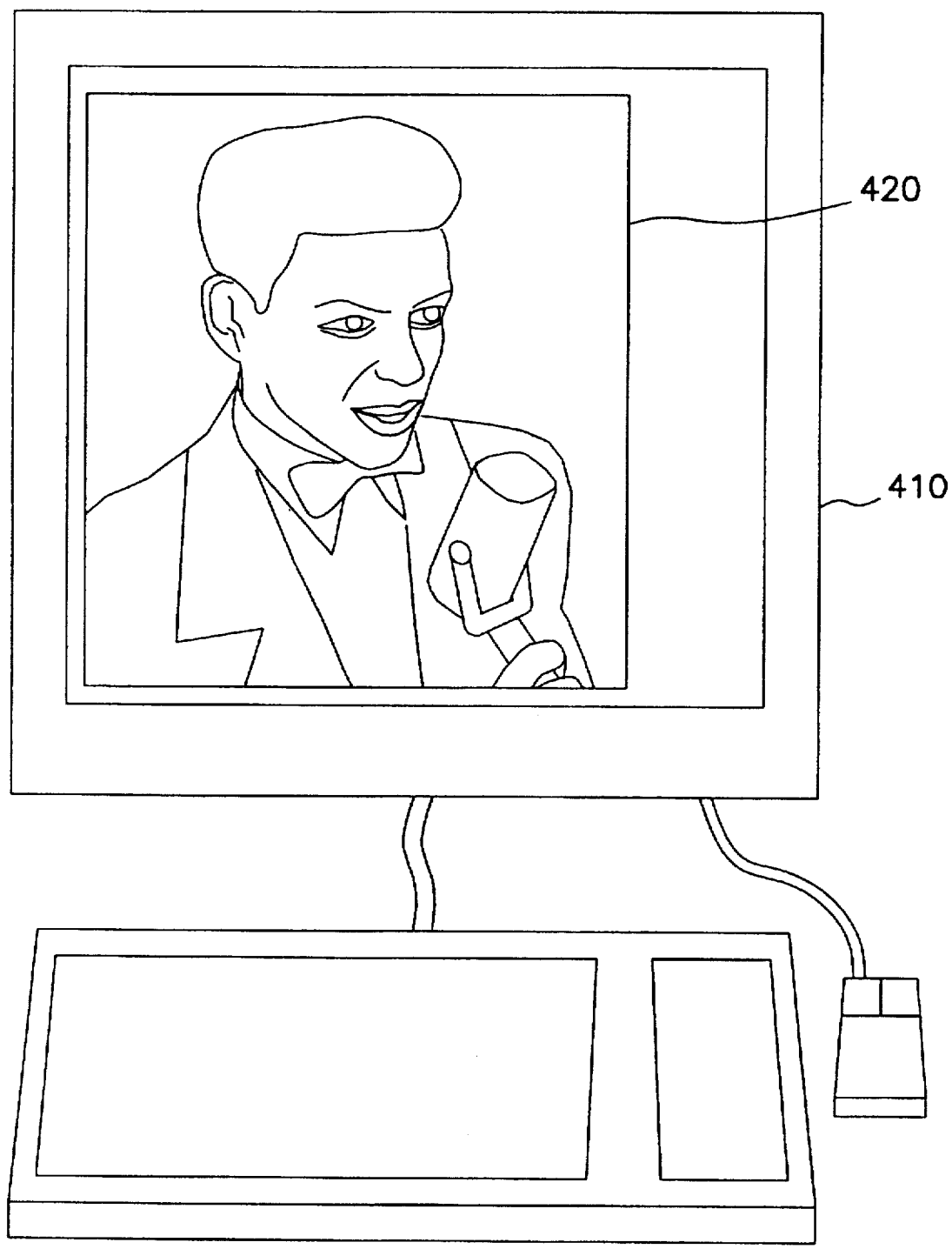
FIG. 4 is an illustration of a computer system playing a movie.

In order to demonstrate the helpfulness of the present invention, FIG. 4 illustrates a computer system 410 playing a traditional animated movie 420. The movie displays on the computer monitor one frame at a time. The movie shows several objects interacting and moving. The objects themselves are made up of several parts or regions.

Figure 5:
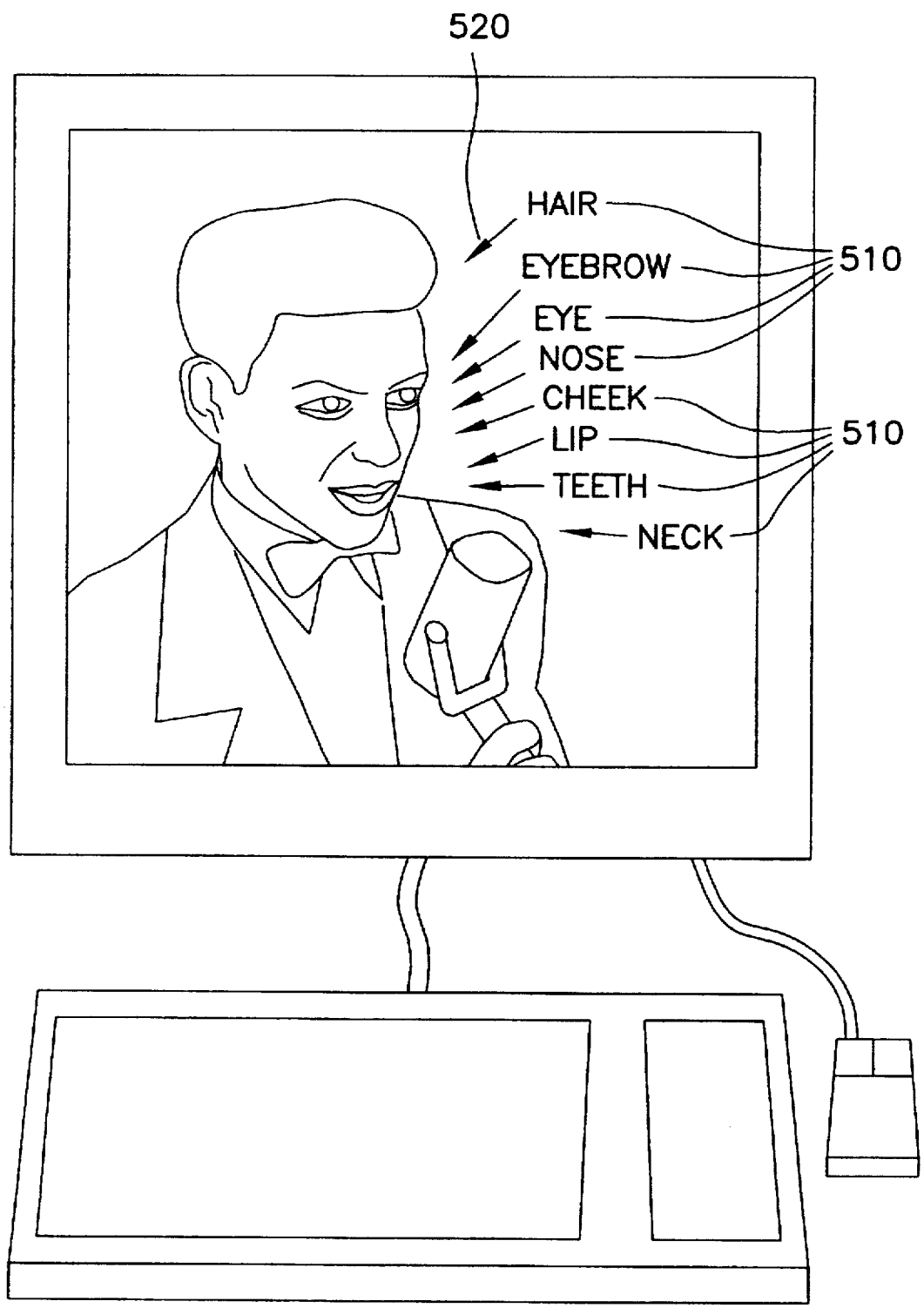
FIG. 5 is a diagram of an animated movie with the traditional method of displaying text to describe objects in the movie.

FIG. 5 shows one method of displaying information about the objects in the movie. Text 510 and pointers 520 are displayed to show the viewer information about the individual elements of the movie. This text is a part of the frames themselves and therefore displays with the movie automatically. The displaying of text must therefore be planned by the movie's creator. The creator must estimate what information the viewer will want to see, at what point in the movie, and for how many seconds. Because the movie may be composed of many objects, the amount of text which can be displayed may become overpowering and so the movie creator must limit the information displayed.

Figure 6:
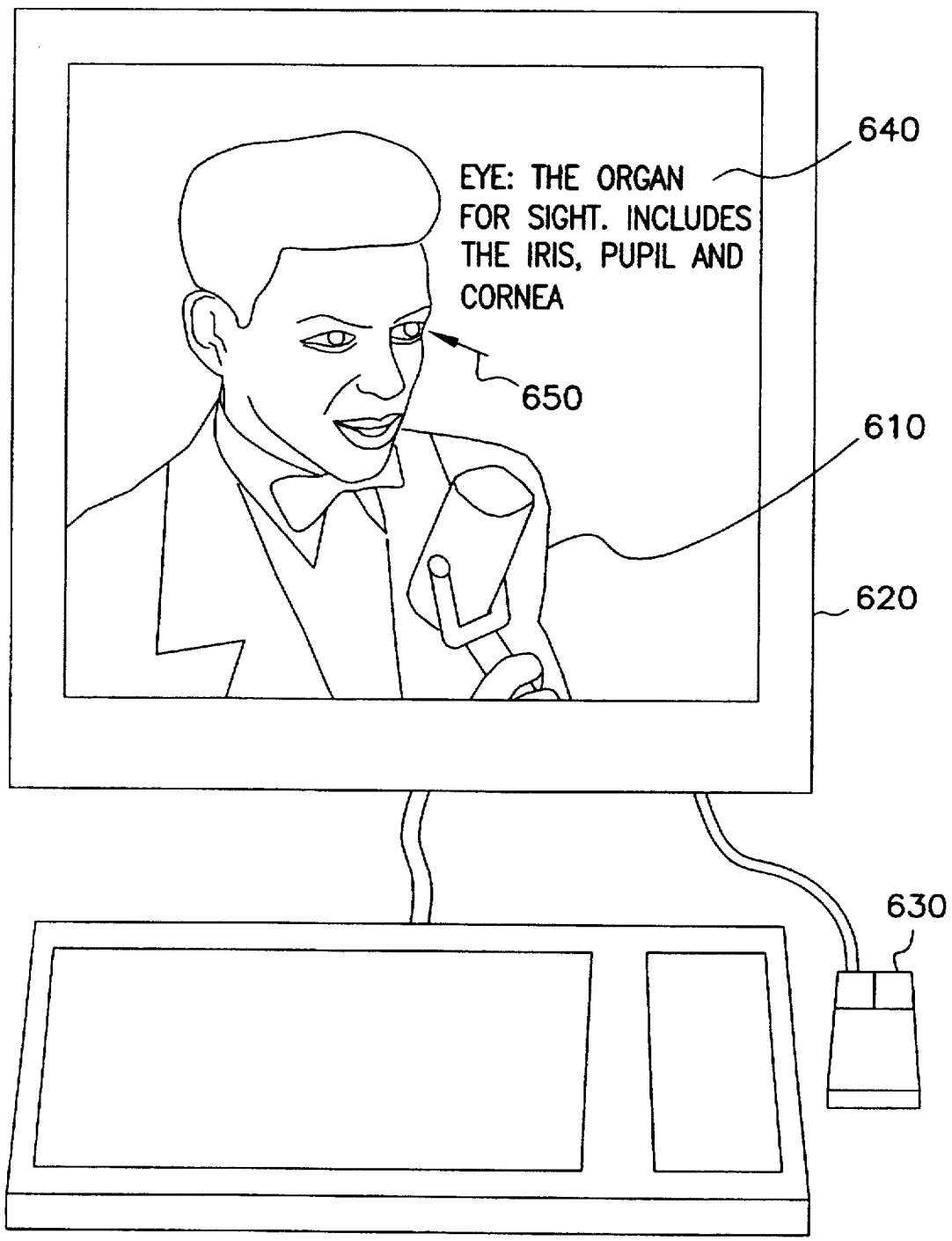
FIG. 6 is a diagram of a movie with the internal labels produced by one embodiment of the present invention. Text only appears when a viewer selects an object with a pointing device.

FIG. 6 shows one embodiment of the present invention in a personal computer system 620 which is playing an animated movie 610. With this embodiment, the viewer can play the movie without textual distraction. Whenever the viewer wants information about an object in the movie, the viewer uses a mouse 630, or other pointing device, to select the object in question. The textual information 640 then appears on the screen corresponding to the object identified by the pointer icon 650. With this method, the user is in control of the information displayed. The user determines when to display the information, which objects to explain textually, and at what point in the movie to display the descriptions. Because the descriptions are revealed only upon the viewer's command, the problem of a large amount of text overwhelming the animated movie is solved.

Figure 7:
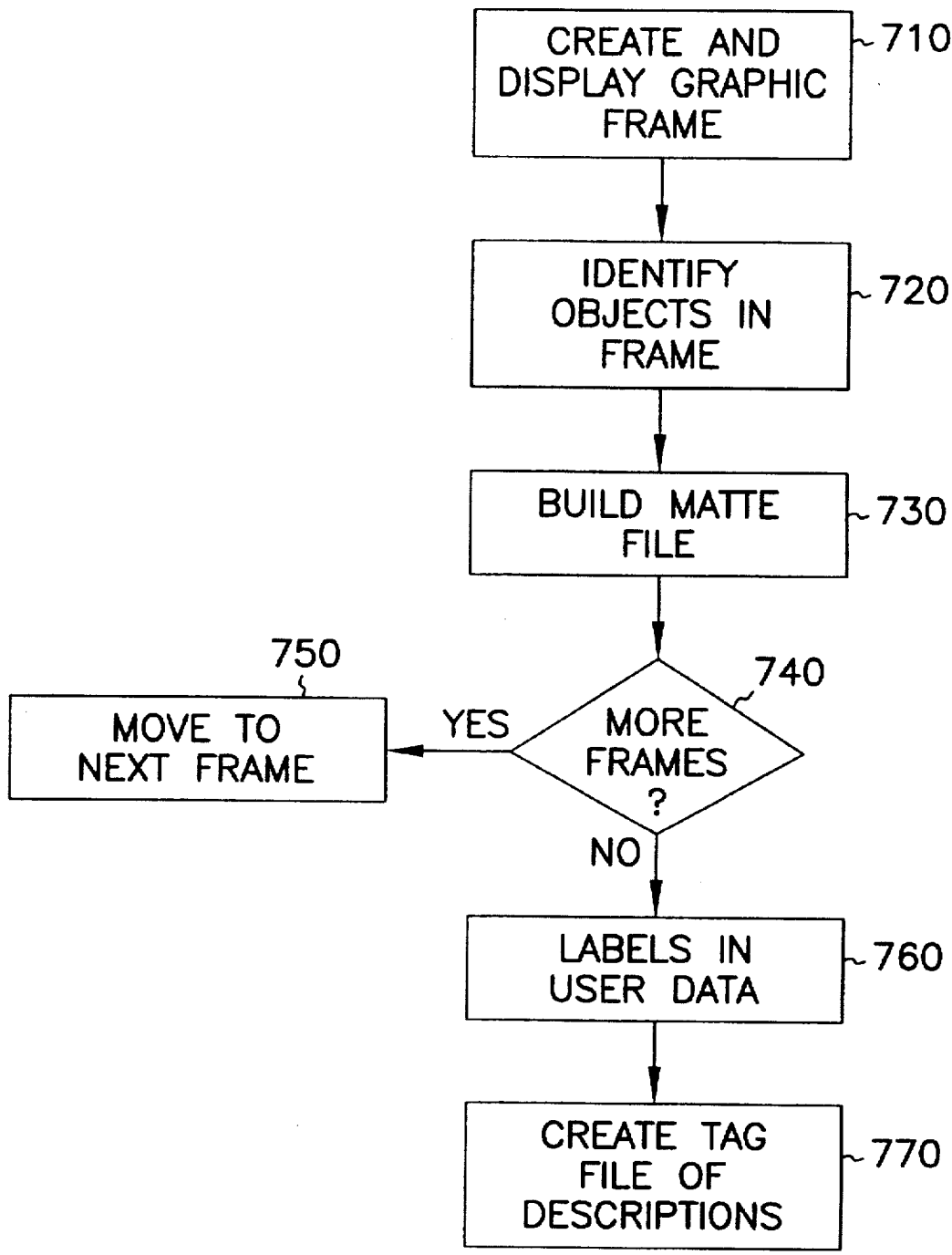
FIG. 7 is a flowchart of the process of creating and labeling animated movies.

FIG. 7 is a flowchart of the process of associating descriptive labels to objects in animated movies. In a graphics program, a frame from the movie is constructed 710 and is saved as a graphics file. For each object in the frame to be labeled, the movie creator identifies the object in the frame 720 and the present invention, which in one embodiment is a software program called MatteMaker, isolates the two-dimensional region in the frame of that object, assigns it a single color 730 and places it in a second graphics file called the matte file. The objects in the regular graphics file and the newly created matte file have corresponding x-y coordinates. The color of each object in the matte file is arbitrary because the colorization of the matte file is done just to assign the same byte value to every pixel of the object's region. For example, in a frame consisting of a tree with leaves, the regions of the frame having leaves would be isolated and assigned the same color, irrespective of individual leaf color and shading. The color chosen could be green. However, choosing blue or red would be just as fine. Because the color itself is unimportant and is used only to assign the same byte value to all pixels, it is appropriate to speak of the matte frame as having false (i.e. arbitrary) colors.

After all objects have been identified and marked in the frame, the next frame is processed 740 and 750.

Once the matte frame contains the distinctly colored regions for the objects in the frame, it is saved as a matte file. In one embodiment, the matte file is prefixed with a header in the form of:

| var type | var name | var description |
|---|---|---|
| long | dataSize; | // size in bytes of compressed data |
| short | width; | // width of source matte in pixels |
| short | height; | // height of source matte in pixels |
| short | pixelSize, | // pixel depth of source image |
| short | mmVersion; | // version of compressed data |
| long | mmReserved; | // for future use. |

The matte file must not be anti-aliased. Anti-aliasing is the process of improving the appearance of a graphic image by smoothing out jagged lines in the image. For example, a diagonal line which creates a jagged edge when viewed, would be improved through anti-aliasing, which would adjust the color values of adjacent pixels to soften the sharpness of the edge. But anti-aliasing would change the false colors of the image. In our previous tree example, the region in the image for the leaves, would be damaged by the process' adjustment of the jagged edges.

Because the matte file is not anti-aliased and because it consists of relatively large regions of single colors, the matte file compresses well using run-length encoding (RLE). Run-length encoding extracts contiguous same-value bytes from the file. These segments are replaced by a two byte sequence. The first byte has its high order bit set to indicate data compression. The remaining seven bits of the first byte indicate the number of repetitions. The second byte is the value which is repeated. For example, a string of six consecutive bytes all having a value of five ("5 5 5 5 5 5") would be compressed to the two bytes "10000110" (high order bit signals compression and remaining 7 bits indicate 6 repetitions) and "00000101" (indicates that "5" is the repeated value). Compression rates of 24:1 are typical for matte files using RLE.

The matte file for the frame is then stored as a video track of a QuickTime movie. In such an embodiment, the primary video track of the movie contains the visual animation frames and is displayed to the viewer. The secondary video track is the matte file which is automatically compressed by the built-in QuickTime RLE algorithm. This track is disabled so that it is invisible while the movie is being viewed. Disabling the track accomplishes data hiding. The advantage to such an embodiment is the ease of retrieving matte data due to the time synchronization of the video tracks.

Along with identifying the regions in the frames of the movies, the labels 760 must be created. When the present invention is embodied as a QuickTime movie, the QuickTime UserData region of the movie is used to store the labels. Labels are a run of byte-sized data. Each run is prefixed with a one-byte description which is a type-descriptor. For example, in one embodiment, 0 is the type-descriptor for a Pascal string, 1 is the type-descriptor of a C string, and 2 is the type-descriptor for a URL (Uniform Resource Locator). This allows the embedded label to take on any kind of meaning.

A tag file is also created for the animation movie 770. The tag file links a specific label with a specific false color value used in the matte file frames. An example format of a tag file is:

| | | |
|---|---|---|
| TAG_NUM 150 | | // Matte file false color value |
| TAG_LEVEL 1 | | // Education level |
| TAG_TEXT | "Tricuspid" | // Label Description |
| TAG_NUM 200 | | |
| TAG_LEVEL 1 | | |
| TAG_TEXT | "Right Atrium" | |
| TAG_NUM 250 | | |
| TAG_LEVEL 1 | | |
| TAG_TEXT | "Right Ventricle" | |

Figure 8:
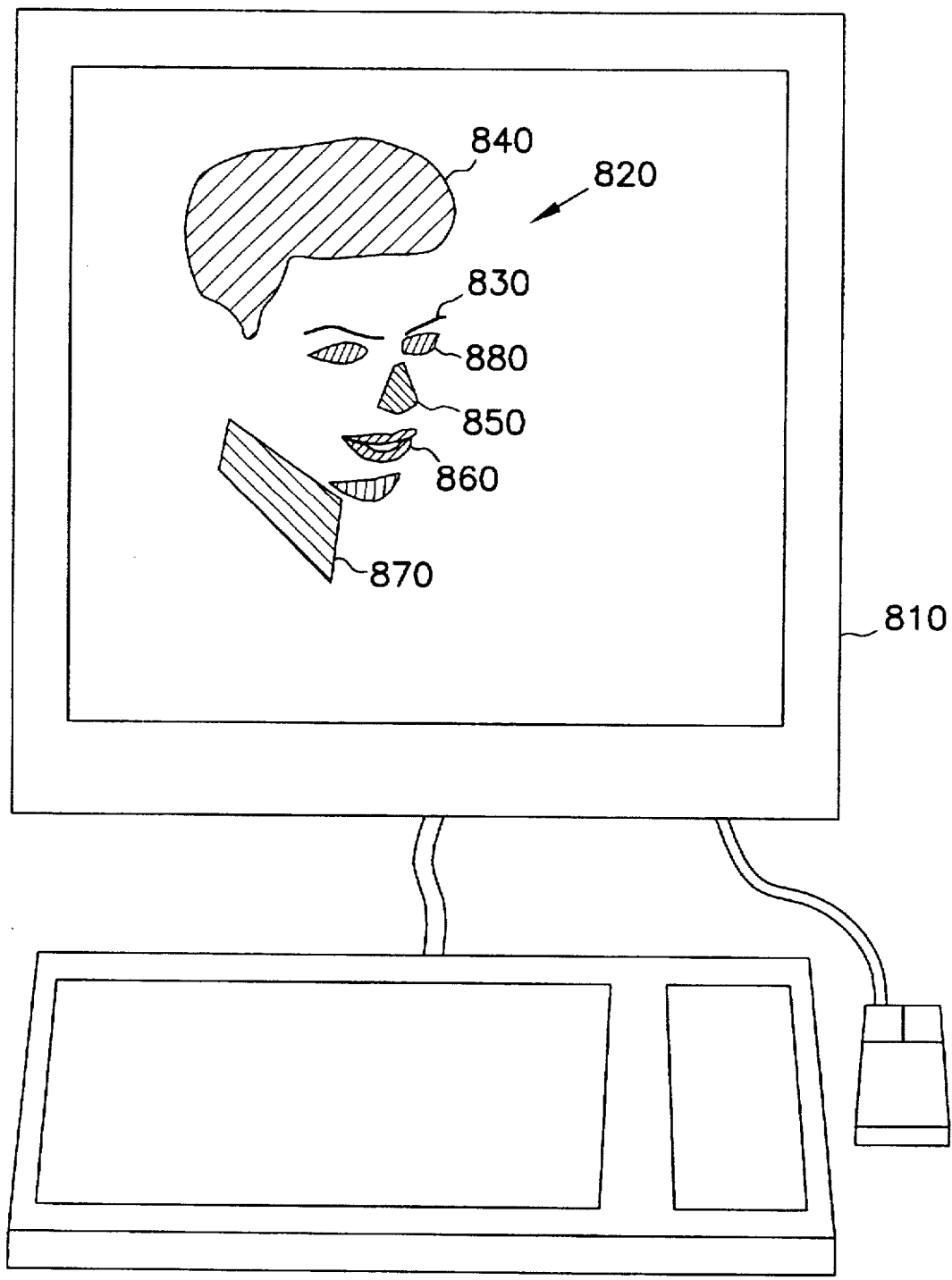
FIG. 8 is a diagram of the displaying of the matte file produced which corresponds to a frame of the animated movie.

FIG. 8 shows a personal computer system 810 displaying one matte file frame 820. The matte file corresponds to a frame in the movie. Refer back to FIG. 6 for the corresponding frame. Each identifiable object in the frame has been separated and assigned a unique false digital color, black 830, blue 840, green 850, brown 860, red 870 and grey 880.

Figure 9:
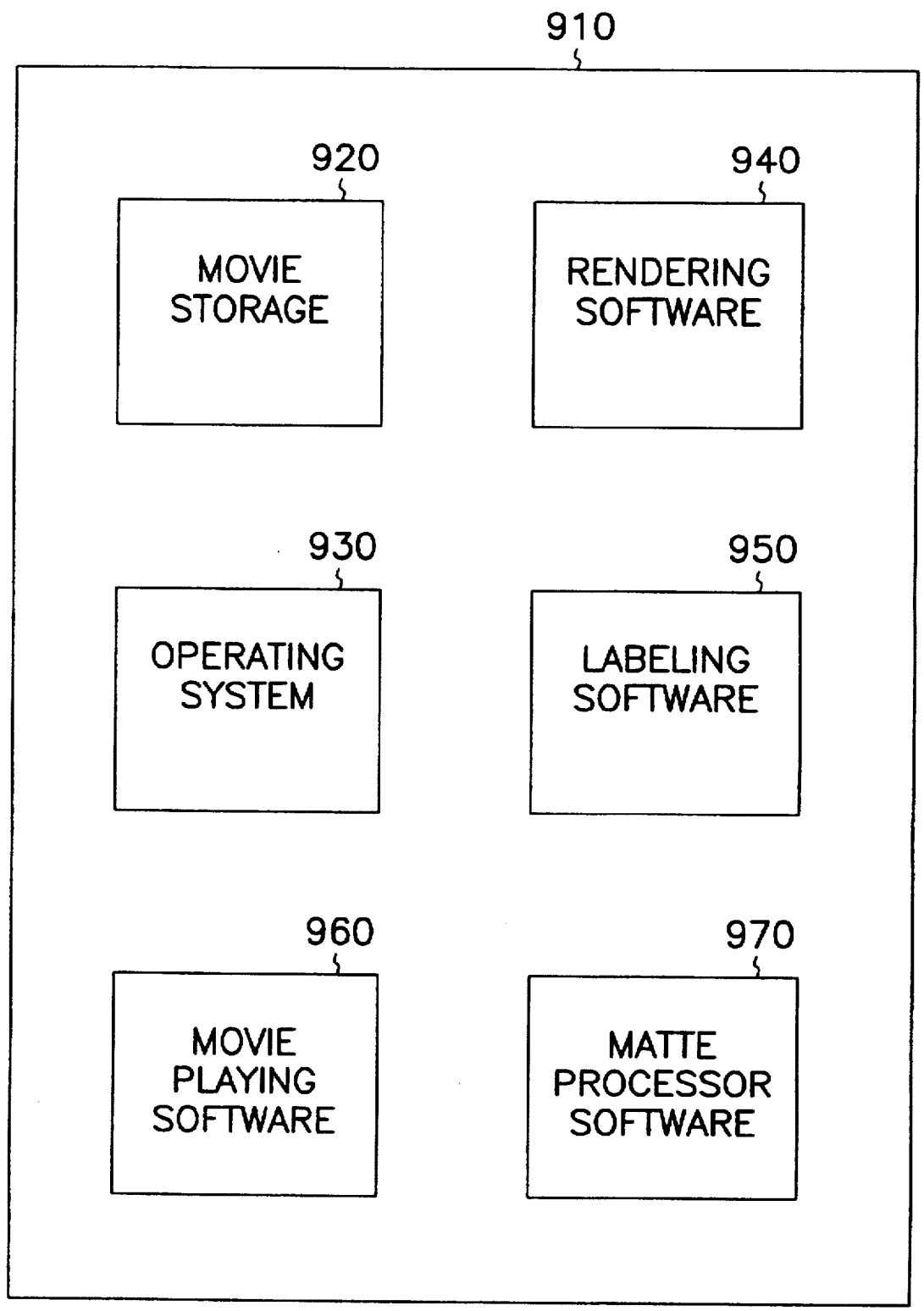
FIG. 9 is a block diagram of a personal computer system with the components used to create and to play animated movies.

FIG. 9 is a block diagram of one embodiment of the present invention. Here, a personal computer system 910, which could be a Macintosh, IBM, a compatible of either of those, or other type of computer, is able to create or play animated movie sequences which are in a storage medium 920, such as RAM, a CD, a floppy disk, an optical disk, or on the computer's hard drive. The personal computer system uses the operating system 930 with rendering software 940 and labeling software 950 (one embodiment of the present invention) in creating the movies. The operating system, movie playing software 960 and the matte interpreter software 970 are used to play the movies.

Figure 10:
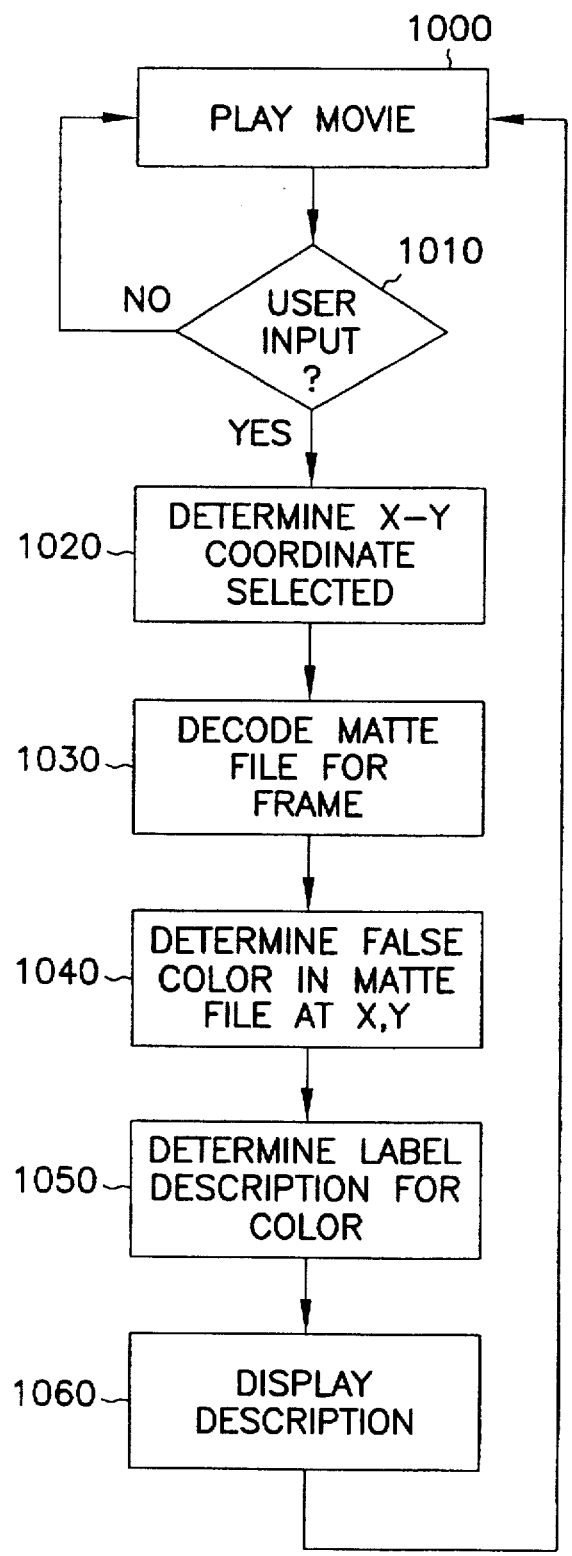
FIG. 10 is a flowchart of the process of playing an animated movie and displaying the labels according to user input.

The process of playing the movies and displaying the labels is flowcharted in FIG. 10. While the movie plays 1000, when a user uses a mouse or other pointing device to select an object in the movie 1010, the x–y coordinates of the selection are calculated 1020. The matte file corresponding to the current frame is decompressed 1030 and the false color value for the same x–y coordinate is determined 1040. From this value, the label description is retrieved 1050 and the label description is moved into the screen memory map locations 1060 so that the description will be displaying on the screen with the movie.

In one embodiment of the invention, multiple forms of information can be linked to an object in a movie. The invention can be configured to display the information appropriate to the viewer's educational needs. For example, if one object on the movie is an eye, then the viewer could be presented with "Eye", "The Eye is an organ for sight", "The Eye includes the iris, pupil and cornea", or "Eye= l'oeil" depending on whether the viewer has selected the "Elementary", "Intermediate", "High School", or "French translation" mode. These multiple education levels could be implemented by a more comprehensive tag file having the following format:

| | | |
|---|---|---|
| TAG_NUM 150 | | // Matte file false color value |
| TAG_LEVEL 1 | | // Education level |
| TAG_TEXT | "Eye" | // Label Description |
| TAG_LEVEL 2 | | |
| TAG_TEXT | "The Eye is an organ of sight" | |
| TAG_LEVEL 3 | | |
| TAG_TEXT | "The Eye includes the iris, pupil and cornea" | |
| TAG_LEVEL 4 | | |
| TAG_TEXT | "Eye = l'oeil" | |

Other embodiments of the present invention are possible without departing from the scope and spirit of the present invention. Other embodiments of this invention include a multiple number of matte files for each frame, allowing different areas of the frame to have a higher resolution of label differentiation.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. A system for labeling elements in an animated movie, comprising:

a processor;

a storage device;

a set of graphic data representing pixels forming a picture to be displayed as a frame of the animated movie;

an element identifier operative to identify an element to label in the picture;

a labeler operative to obtain a label description for the element in the picture;

a label numberer operative to assign a label number to uniquely identify the element;

a region identifier operative to identify a region of pixels which form the element in the picture;

a matte creator operative to create a matte data item corresponding to the region of pixels identified in the graphic data and storing the item in the storage device;

a label association associating the label number to the pixels represented by the matte data item; and a label index associating the label description to the label number.

2. A system for presenting descriptions in an animated movie, wherein the movie is a series of picture frames formed by pixels comprising:

a processor;

a storage device;

a screen display;

a pointer operative to determine an x–y coordinate of a user input in a frame of the animated movie;

a matte data item corresponding to the frame of the animated movie from the storage device;

an element indicator in the matte data corresponding to the x–y coordinate;

a label value corresponding to the element indicator in the matte data;

a label description corresponding to the label value; and a screen display operative to display the label description.

3. The system for presenting descriptions in an animated movie of claim 2 wherein the screen display operative to display the label description simultaneously displays the animated movie.

4. A method for labeling elements in an animated movie, comprising the steps of:

maintaining graphic data in a storage medium representing pixels forming a picture to be displayed as a frame of the animated movie;

identifying an element to label in the picture;

obtaining a label description for the element in the picture;

choosing a label number to uniquely identify the element;

identifying a region of pixels which form the element in the picture;

creating a matte data item corresponding to the region of pixels identified in the graphic data and storing the matte data item in a storage medium;

associating the label number to the pixels represented by the matte data item; and maintaining in a storage medium a label index associating the label description to the label number.

5. A method for presenting descriptions in an animated movie on the screen display of a computer system, comprising operating the computer system to perform the steps of:

receiving a user input indicating a location on the screen display while a frame from the animated movie is playing on the screen display;

determining an x–y coordinate of the user input in the frame;

retrieving a matte data item from a storage medium for the frame of the animation movie;

determining a pixel address in the matte data corresponding to the x–y coordinate;

determining a label value for the pixel address in the matte data;

determining a label description for the label value; and displaying the label description on the screen display.

6. A computer readable medium having a computer executable program code embodied thereon, the computer executable code comprising:

computer executable code for causing a computer to maintain graphic data representing pixels forming a picture to be displayed as a frame of the animated movie;

computer executable code for causing a computer to obtain a label description for an element in the picture;

computer executable code for causing a computer to associate the label description with a label identification number;

computer executable code for causing a computer to identify a region of pixels which form the element in the picture;

computer executable code for causing a computer to create a matte data item corresponding to the region of pixels identified in the graphic data and to store the matte data item in a storage device; and computer executable code for causing a computer to associate the label identification number to the pixels represented by the matte data item.

7. A computer readable medium having computer executable program code embodied thereon, the computer executable code comprising:

computer executable code for causing a computer to receive a user input indicating a location on a display device coupled to the computer while a frame from the animated movie is playing;

computer executable code for causing a computer to determine an x–y coordinate of the user input in the frame;

computer executable code for causing a computer to retrieve a matte data item for the frame of the animation movie;

computer executable code for causing a computer to determine a pixel address in the matte data item corresponding to the x–y coordinate;

computer executable code for causing a computer to determine a label identification number for the pixel address in the matte data item;

computer executable code for determining a label description for the label identification number; and computer executable code for displaying the label description on the screen display.

\* \* \* \* \*